(12) United States Patent
Band

(10) Patent No.: US 9,215,224 B2
(45) Date of Patent: *Dec. 15, 2015

(54) AUTOMATED SECURITY TOKEN ADMINISTRATIVE SERVICES

(71) Applicant: Assa Abloy AB, Stockholm (SE)

(72) Inventor: Jamie Angus Band, Palo Alto, CA (US)

(73) Assignee: Assa Abloy AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/858,464

(22) Filed: Apr. 8, 2013

(65) Prior Publication Data

US 2014/0096223 A1 Apr. 3, 2014

Related U.S. Application Data

(63) Continuation of application No. 13/275,665, filed on Oct. 18, 2011, now Pat. No. 8,438,623, which is a continuation of application No. 10/304,958, filed on Nov. 27, 2002, now Pat. No. 8,065,717.

(51) Int. Cl.
*G06F 7/04* (2006.01)
*H04L 29/06* (2006.01)
(Continued)

(52) U.S. Cl.
CPC .............. *H04L 63/08* (2013.01); *G06F 21/31* (2013.01); *G06F 21/32* (2013.01); *G06F 21/33* (2013.01); *G06F 21/34* (2013.01); *G06F 21/445* (2013.01); *G06F 21/604* (2013.01); *G06Q 20/341* (2013.01); *G06Q 20/355* (2013.01); *G06Q 20/367* (2013.01); *G06Q 20/3672* (2013.01); *G06Q 20/3674* (2013.01); *G06Q 20/3676* (2013.01); *G06Q 20/3678* (2013.01); *G06Q 20/4097* (2013.01); *G07F 7/1008* (2013.01); *G06F 2221/2101* (2013.01); *G06F 2221/2103* (2013.01); *G06F 2221/2119* (2013.01); *G06F 2221/2153* (2013.01)

(58) Field of Classification Search
USPC .................................. 726/16–20, 26–29, 4–9
See application file for complete search history.

(56) References Cited

U.S. PATENT DOCUMENTS 6,587,853 B1 * 7/2003 LaRue .................................. 1/1
6,715,082 B1 * 3/2004 Chang et al. ...................... 726/8
(Continued)

FOREIGN PATENT DOCUMENTS

EP 1 162 807 A2 12/2001

OTHER PUBLICATIONS

Chess et al., "Itinerant agents for mobile computing," Personal Communications, IEEE Year: 1995, vol. 2, Issue: 5, pp. 34-49.*

(Continued)

*Primary Examiner* — Roderick Tolentino
(74) *Attorney, Agent, or Firm* — Muirhead and Saturnelli, LLC

(57) ABSTRACT

This invention provides a system, method and computer program product to allow a user to access administrative security features associated with the use of a security token. The administrative security features provide the user the ability to unlock a locked security token, diagnose a security token, activate and deactivate a security token, request a replacement security token or temporary password or report the loss of a security token. The invention comprises a client application which integrates into the standard user login dialog associated with an operating system. A portion of the user dialog is linked to a remote server to access the administrative services.

28 Claims, 7 Drawing Sheets

(51) Int. Cl.
*G06F 21/31* (2013.01)
*G06F 21/32* (2013.01)
*G06F 21/33* (2013.01)
*G06F 21/34* (2013.01)
*G06F 21/44* (2013.01)
*G06F 21/60* (2013.01)
*G06Q 20/34* (2012.01)
*G06Q 20/36* (2012.01)
*G06Q 20/40* (2012.01)
*G07F 7/10* (2006.01)

(56) References Cited

U.S. PATENT DOCUMENTS 7,017,188 B1* 3/2006 Schmeidler et al. ............ 726/26
2002/0087601 A1* 7/2002 Anderson et al. ............. 707/515
2002/0112178 A1* 8/2002 Scherr ........................... 713/200
2002/0188678 A1* 12/2002 Edecker et al. ................ 709/204
2003/0055990 A1* 3/2003 Cheline et al. ................ 709/229
2003/0087601 A1* 5/2003 Agam et al. ..................... 455/39
2003/0088633 A1* 5/2003 Chiu et al. ..................... 709/206
2003/0200453 A1* 10/2003 Foster et al. ................... 713/200
2003/0217132 A1* 11/2003 Batten et al. .................. 709/223
2003/0221126 A1* 11/2003 Berman et al. ................ 713/201
2004/0030603 A1* 2/2004 Grundfest ....................... 705/26

OTHER PUBLICATIONS

Sherman et al., "Secure network access using multiple applications of AT&T's smart card," AT&T Technical Journal Year: 1994, vol. 73, Issue: 5 pp. 61-72.*

* cited by examiner

AUTOMATED SECURITY TOKEN ADMINISTRATIVE SERVICES

RELATED APPLICATIONS

This application is a continuation of U.S. application Ser. No. 13/275,665 filed Oct. 18, 2011 (U.S. Pat. No. 8,438,623), which is a continuation of U.S. application Ser. No. 10/304,958 filed Nov. 27, 2002 (U.S. Pat. No. 8,065,717), which are hereby incorporated by reference.

FIELD OF THE INVENTION

The present invention relates to a data processing system, method and computer program product and more specifically to a system, method and computer program product for gaining access to administrative security services without having authenticated access to an operating environment.

BACKGROUND

Security token and credential management systems track, monitor and control the state of authentication tokens and credentials assigned to users. Frequently, the security tokens managed by such systems become locked, lost, stolen, damaged, deactivated, or temporarily misplaced by the user. Many of these issues prevent the user from logging into an operating system. In other situations, it is useful for the user to obtain diagnostic information related to a security token prior to logging in. The user may also require temporary access to the operating system via some other means because his or her security token is not available or is non-operational.

In the relevant art, when a user is unable to gain access to the operating system due to unavailability of his or her security token, the options available to correct the situation usually involves a call to a support desk, logging into a restricted guest account or some combination of the two. Present solutions do not offer the user the capability to access the services of a security token management system while logged out or locked out of the operation system.

The support desk option is problematic in that the user may not be able to contact the support staff during non-working hours (e.g., nights and weekends) or during traditionally heavy demand periods (e.g., Monday mornings, following a system interruption, migration to another operating system or software application, etc.)

In certain circumstances, the user may be prevented from accessing an operating system or reporting a lost or stolen security token for an extended period of time (e.g., Christmas Holidays) which not only impacts worker productivity but may lead to future security compromises. Maintaining a full time support staff can be prohibitively expensive for smaller organizations.

Guest accounts provide only limited access to system resources and require that guest accounts be established and maintained on all computers where a potential user may need access to resources which increases the risk of introducing security vulnerabilities.

Thus, an automated mechanism which allows a user to restore access privileges without the intervention of a support organization is highly desirable.

SUMMARY

This invention addresses the above cited limitations and provides a system, method and computer program product for user controlled security token administration.

The invention comprises a local client and a remote server in processing communications over a network, each including all functional components of a computer system such as associated hardware, peripherals, storage devices, operating system and applications software. The network includes local area networks, wide area networks and wireless networks.

The local client further includes an application which provides access to a user controlled security token administration application installed on the remote server and also serves as a communications interface with a locally connected security token. The client application is integrated into the operating system's login access application and user dialog interfaces for example, msgina.dll associated with Microsoft® Windows NT and successor products or a pluggable authentication module (PAM) associated with UNIX® based operating systems. The local client includes normal desktop and laptop computers and thin clients such as personal data assistants (PDA), security token equipped cellular telephones and related wireless devices.

The remote server is a designated authentication server having a unique universal resource locator (URL) number, the applications software and stored verification data to implement the invention. An example configuration is described in a product description sheet, "ActivCard® Identity Management System," by the assignee of the invention. The product description sheet is herein incorporated by reference.

The integrated login dialog interface provides one-stop access to either the operating system or the user controlled security token administration application. In one embodiment of the invention, a portion of the user login dialog interface is actually remotely displayed by the server using HTML, XML or equivalent protocols but appears to the user as a local application. Accessing the user controlled security token administration application does not require the normal user login procedures but does require the user to correctly supply at least one credential known or otherwise available to the user such as a biometric scan entry, password, PIN, passphrase or responses to a question and answer session. The credential is used for identifying the user and establishing the user's access privileges to services and resources.

To ensure that the user is actually communicating with the proper remote server, a host authentication session is performed using public key cryptography methods such as traditional challenge/response or digital certificate exchange. Once the server is authenticated to the local client, the user may be prompted to supply his or her credentials. Once the user has been authenticated to the remote server, based on comparisons to previously stored credentials, the user may initiate one or more functions including diagnostics of the security token, reactivating or deactivating the security token, requesting a replacement security token, requesting and enabling a temporary password or automatically granting access to previously unavailable services and resources.

The administrative application installed on the remote server processes the user request and performs the functions by sending the appropriate command strings and security codes to the security token via the client application to service the request. In situations where a temporary password is requested, the newly enabled password is visually displayed for a limited period of time.

In an alternate embodiment of the invention, the remote server may be replaced by an internal security token application which is invokeable by the user. In this embodiment of the invention the user performs essentially the same authentication process as described for the remote server embodiment but communicates locally with the security token directly via the local client application. Authentication of the security token to the user is performed by visual confirmation or by recognition of the authentication dialogs occurring between the user and the security token.

The communications between the local client and remote server is performed using a secure messaging protocol such as IPsec, SSL, SSH, TLS, WAP or equivalent.

DETAILED DESCRIPTION

This invention provides a system, method and computer program product for user controlled security token administration without having to establish an active session.

Figure 1:
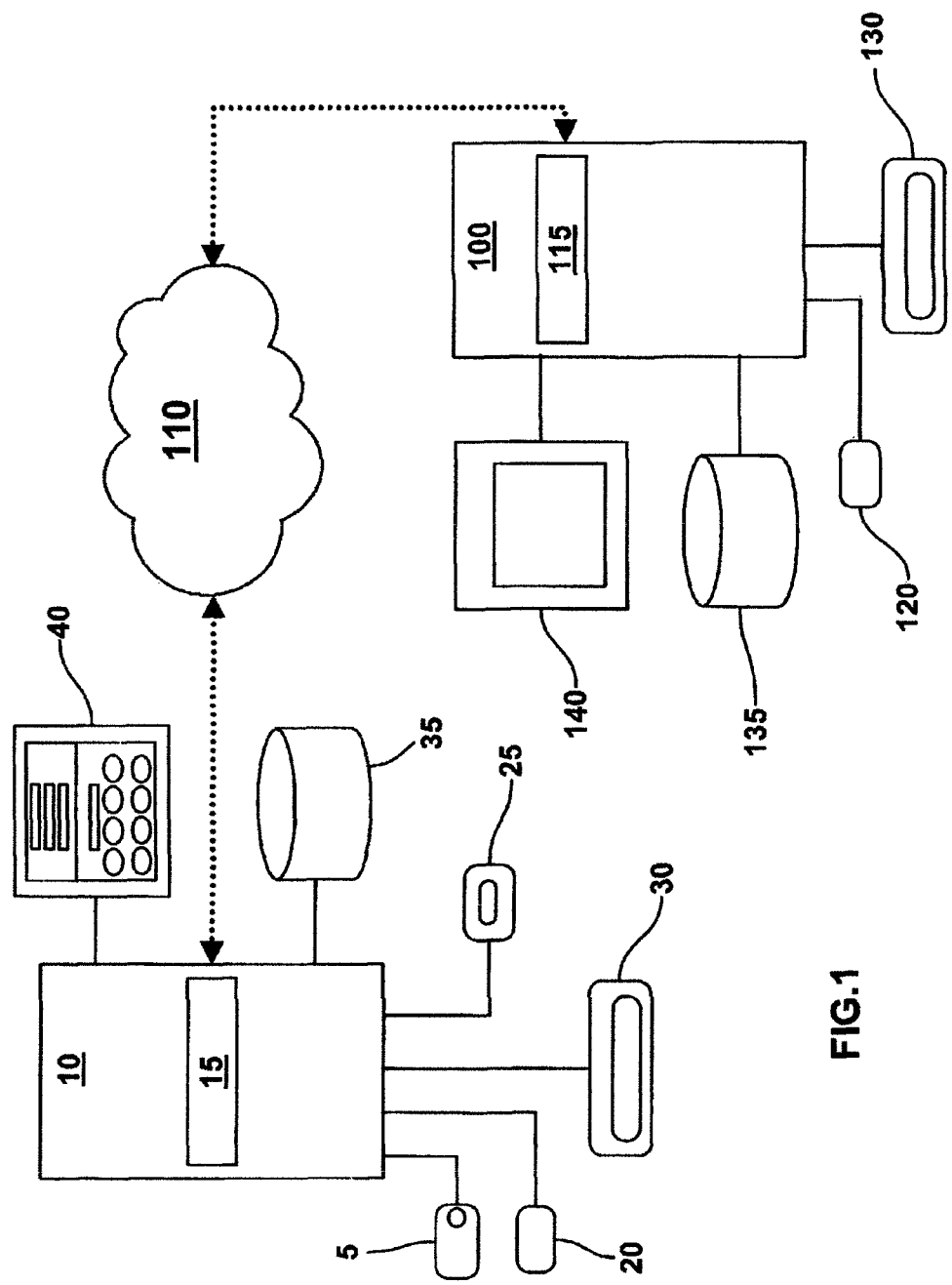
FIG. 1—is a generalized block diagram illustrating the invention.

Referring to FIG. 1, the invention comprises a local client 10 and a remote server 100 in processing communications over a network 110, both the local client 10 and remote server 100 include user input devices such as keyboards 30, 130, and mice 20, 120, displays 40, 140, operating systems, applications software 15, 115 and memory storage devices 35, 135. The displays 40, 140 may include touch sensitive screens as another user input devices. The local client 10 further includes a biometric scanner 25 as an alternative to memorized credentials (e.g., PINs, passwords, passphrases, question and answer sessions) and a security token 5.

The security token 5 includes security resources and information such as cryptographic keys and algorithms for accessing system resources and services following authentication of the user. A user authentication mechanism included in the security token is provided with a changeable security state to prevent fraudulent use of the token. For example, a common anti-fraud counter installed in security tokens limits the number of incorrect PIN entries to a predetermined number. If the predetermined number is exceeded, the security token is placed in a locked security state which requires receipt of specific unlock information in order to reset the anti-fraud counter and regain use of the security token.

The applications software 15 installed on the local client 10 provides access to a user controlled security token administration application 115 installed on the remote server 100 and also serves as a communications interface with the locally connected security token 5. The client application 15 is integrated into the operating system's login access application and user dialog interfaces such as msgina.dll associated with the WINLOGON.EXE program included in Microsoft® Windows NT and successor products or a pluggable authentication module (PAM) associated with UNIX® based operating systems.

Communications over the network 110 between the local client and remote server is performed using a secure messaging protocol such as IPsec, SSL, SSH, TLS, WAP or equivalent.

The administrative application 115 installed on the remote server allows a local user to access administrative services related to user access without having to establish an active session with the local operating environment or receive assistance from a support organization. The administrative application includes the ability to authenticate the user based on a supplied biometric sample, password, passphrase, PIN, question and answer session or any combination thereof.

Figure 1A:
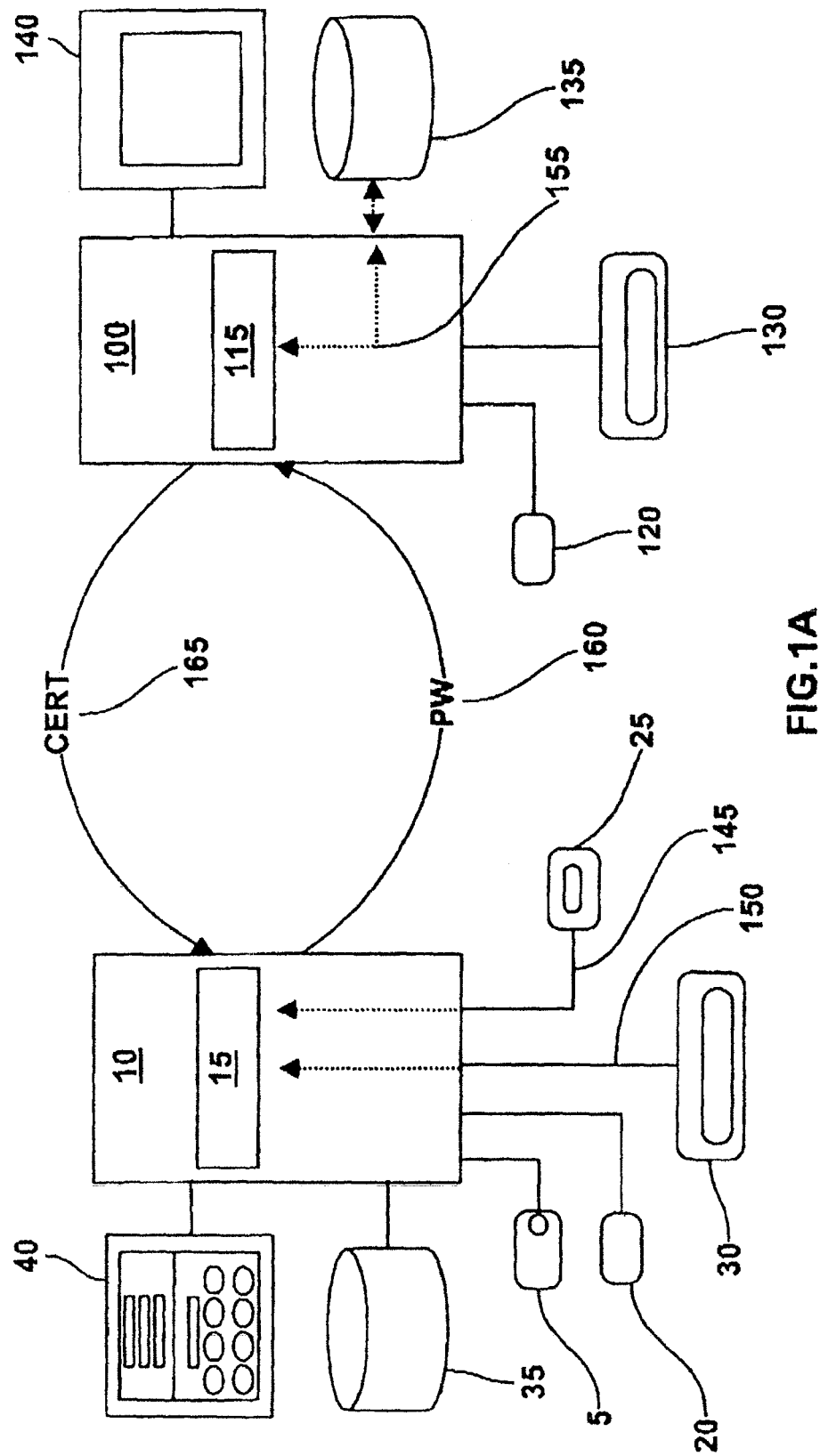
FIG. 1A—is a generalized block diagram illustrating a mutual authentication session between a client and a remote server.

FIG. 1A depicts a mutual authentication cycle between the local client 10 and the remote server 100. A user located at the local client 10 selects a function from a dialog box displayed on the display 40. The selection causes the remote server to first authenticate to the client using public key infrastructure method. A digital certificate 165 is used as an example in FIG. 1A. Once the remote server 100 has been successfully authenticated, the user either supplies a biometric sample 145, or memorized credential 150 depicted as a password PW 160. Equivalent memorized credentials include passphrases, PINs, interactive question and answer sessions using the display 40, or any combination thereof. The results of which are sent to the remote server 100 for authentication. The received credential is authenticated by comparing 155 the received credential to those retrieved from storage 135.

Figure 1B:
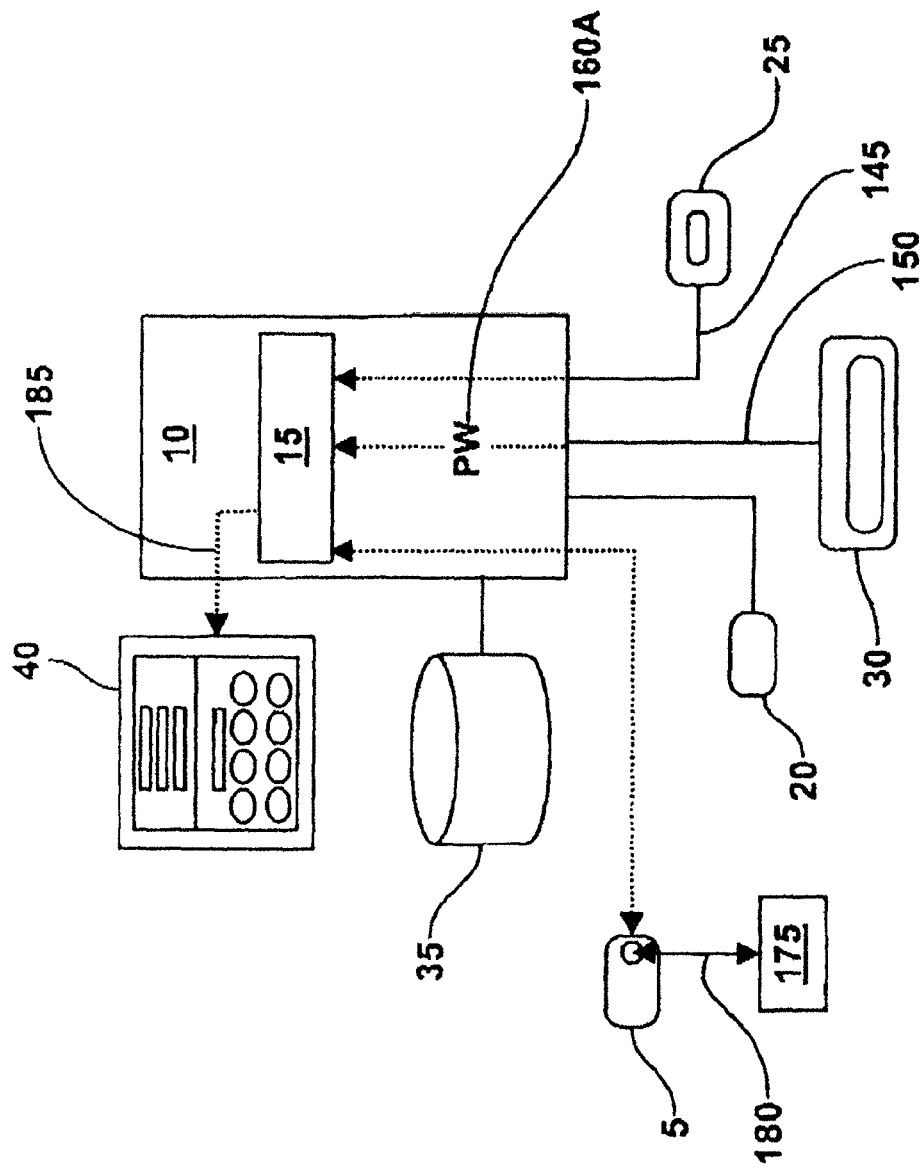
FIG. 1B—is a generalized block diagram illustrating an alternate embodiment of the invention.

FIG. 1B depicts an alternate embodiment of the invention where access to administrative services are performed locally using the client application 15 and a token application 175 installed inside the security token 5. As before, the user located at the local client 10 selects a function from the dialog box displayed on the display 40. The selection causes the token application 175 to authenticate the user. The user either supplies a biometric sample 145, or memorized credential 150 depicted as a password PW 160A.

The biometric sample 145 or credential PW 160A is sent 180 to the security token 5 for processing by the token application 175. If the user is authenticated, access to the security token resources and services is provided by changing a security state within the security token.

Figure 2:
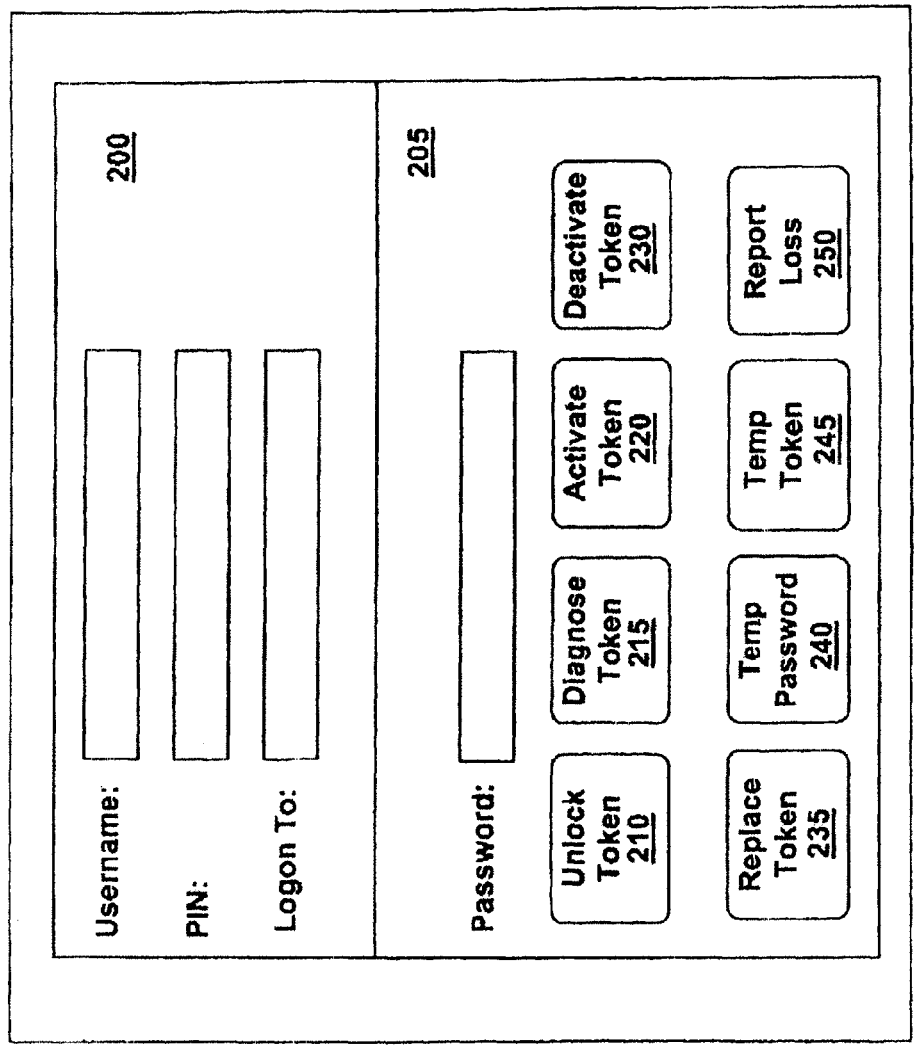
FIG. 2—is a detailed block diagram illustrating a user interface dialog.

FIG. 2 depicts an example user interface display provides normal authenticated access to system resources and services 200 or allows selection of administrative services 205 if the user is unable to gain normal access. The upper portion of the user dialog 200 is generated by the local operating system. The lower portion of the user interface display 205 in the preferred embodiment of the invention is a remote web page which is displayed locally. The web page may be constructed using hypertext markup language (HTML), extensible markup language (XML) or variations thereof. In an alternate embodiment of the invention, the lower portion of the user interface display 205 is generated locally and accesses the remote server application once a selection is made.

Examples of available options include unlocking a locked security token 210, diagnosing a security token which may be malfunctioning 215, activating a security token 220, deactivating a security token, requesting a replacement security token 235, requesting a temporary password 240, requesting a temporary security token 245 and reporting the loss of a security token 250. All of the options may be considered as security states in which the user desires a change. One skilled in the art will appreciate that other options to suit a particular security or administrative requirement may be provided as well.

Figure 2A:
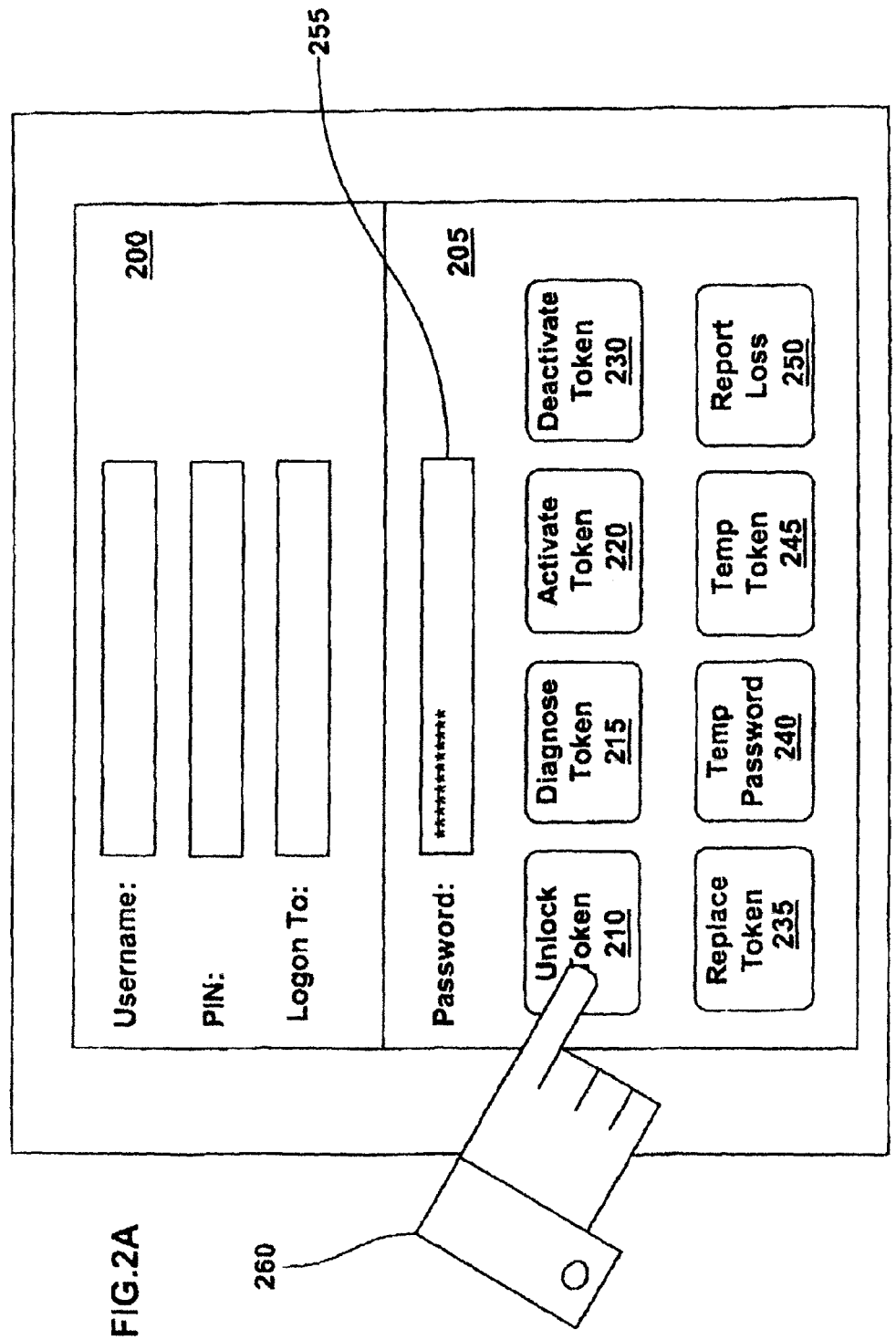
FIG. 2A—is a detailed block diagram illustrating the selection of an option available from the user interface dialog.

Referring to FIG. 2A, an example session is shown where a user 260 selects the unlock security token option 210. A password 255 is then provided to authenticate the user to the remote server.

Figure 3:
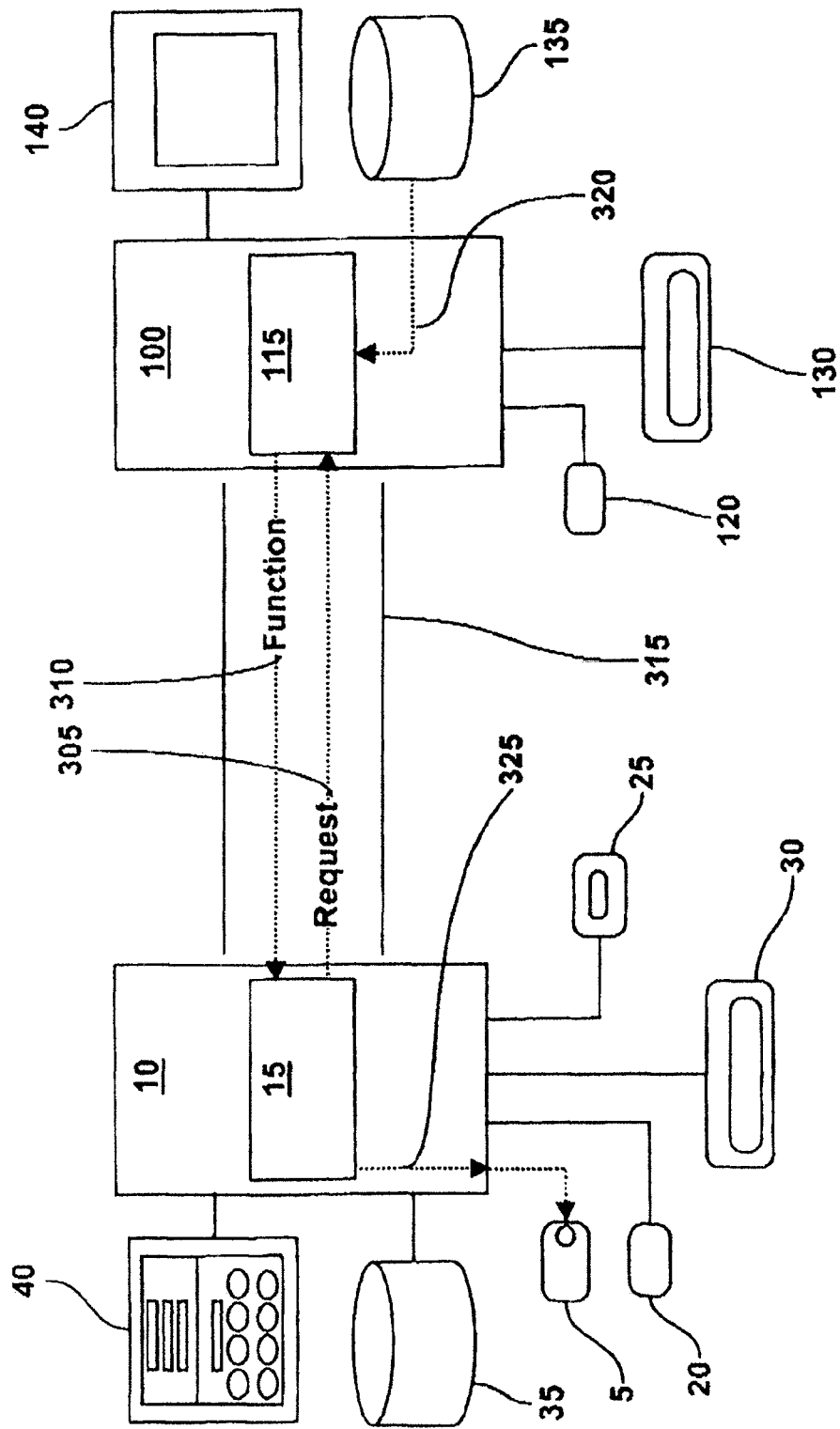
FIG. 3—is a detailed block diagram illustrating processing of a request by the remote server.

Referring to FIG. 3, the request 305 to unlock the security token is sent to the remote server 115 using the secure messaging protocol 315 for example, IPsec, SSL, SSH, TLS, WAP or equivalent. The request is processed by the remote server application 115 which retrieves 320 the proper function 310 from storage 135. The function 310 is sent to the local client application 15 for routing 325 into the security token 5 for final processing.

Figure 4:
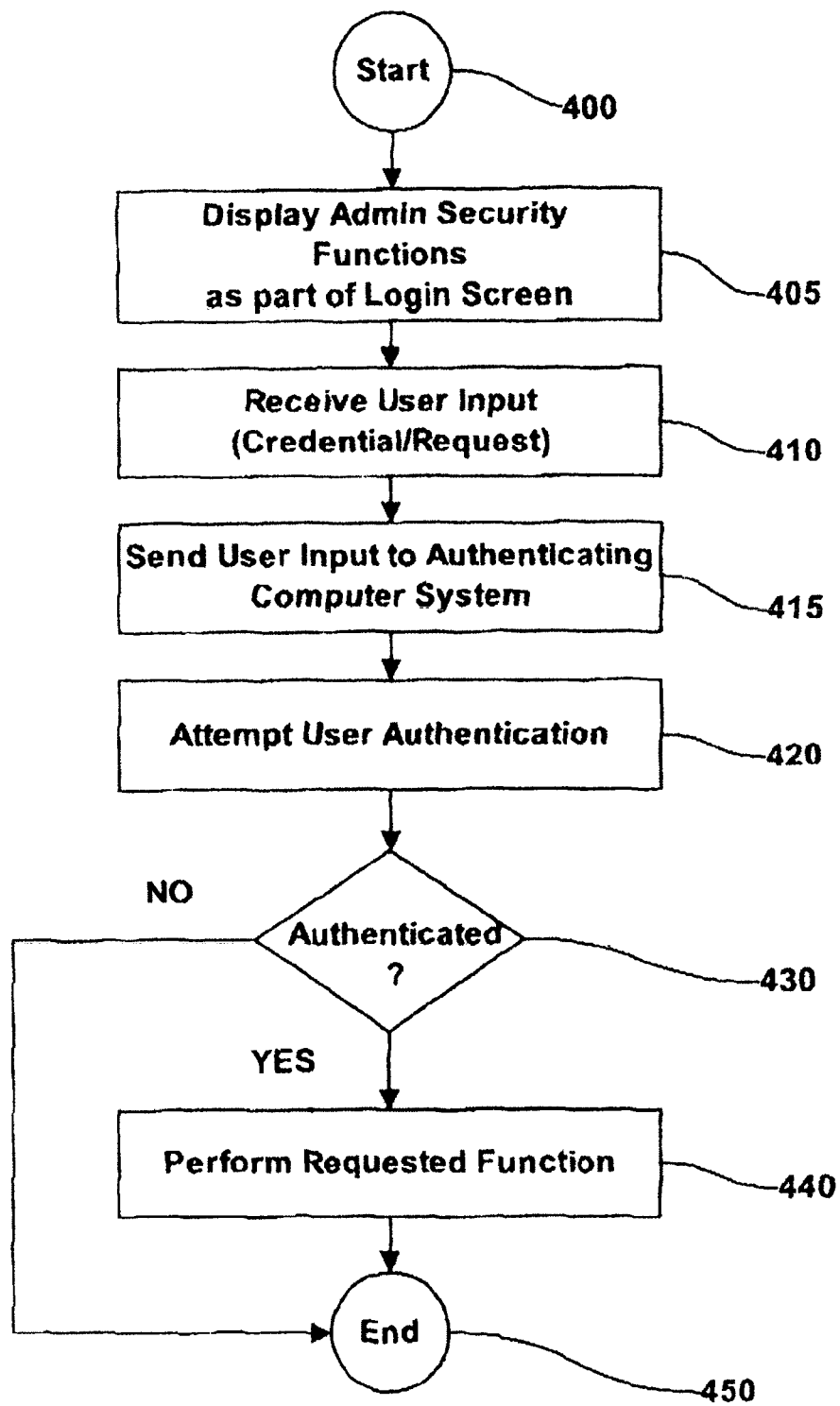
FIG. 4—is a flowchart illustrating the major steps for implementing the invention.

Lastly, FIG. 4 depicts the major steps in implementing the invention. The process is initiated 400 by a user reviewing available administrative security functions displayed 405 on a display associated with a local client. The user is then prompted to enter a credential 410. The user's request and credential are then sent to the authenticating computer system for processing 415. The authenticating computer system attempts to authenticate the entity 420. The authenticating computer system may be a locally connected security token or a remote server. If the user is not authenticated 430, processing ends 450. If the entity is authenticated 430, the requested service is performed 440 on a locally connected security token and processing ends 450.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. Other variations and embodiments are possible in light of above teachings, and it is not intended that this Detailed Description limit the scope of invention, but rather by the Claims following herein.

What is claimed is:

1. A local client device in processing communications with a server, the local client device comprising:
   one or more functionally connected user input devices;
   a user interface that handles input and output with a user;
   a memory for storing computer executable instructions;
   a hardware processor coupled with the memory, the processor configured to execute the computer executable instructions to perform the operation comprising:
   displaying available administrative security functions on the local client device;
   receiving a selection from the user for an administrative security function from the displayed administrative security functions;
   generating and sending an administrative access request to a server to perform the at least one administrative security function on a security token;
   wherein the security token is separate from the local client device;
   prompting the user for at least one user credential;
   authenticating the user to the remote server, based on the at least one user credential;
   in response to the server authenticating the user:
   mediating the at least one administrative security function between the server, the client and the security token, wherein the server responds to the administrative access request by retrieving the at least one administrative function and sending the at least one administrative function to said local client device for routing into said security token and performing the at least one administrative function on the security token the at least one administrative security function
   and wherein the at least one administrative access request includes authenticating the user to the server using the at least one credential without requiring the user to log on to an operating environment associated with the local client device.

2. The local client, according to claim 1 wherein the server and the local client mutually authenticate to each other.

3. The local client, according to claim 2 wherein the server is authenticated to the local client using a public key infrastructure methodology.

4. The local client, according to claim 2 wherein the security token is unlocked.

5. The local client, according to claim 2 wherein diagnostics are performed on the security token.

6. The local client, according to claim 2 wherein the security token is reactivated and deactivated.

7. The local client, according to claim 2 wherein a replacement security token is requested.

8. The local client, according to claim 2 wherein a temporary password is enabled.

9. The local client, according to claim 2 wherein the user is automatically allowed access to the system resources and services.

10. The local client, according to claim 2 wherein the user reports that the security token has been lost, damaged or stolen.

11. The local client, according to claim 2 wherein the processing communications includes a secure communications protocol.

12. The local client, according to claim 11 wherein the secure communications protocol includes SSL, SSH, TLS, WAP or IPSEC.

13. The local client, according to claim 3 wherein the public key infrastructure methodology includes challenge/response authentication or digital certificate exchange.

14. The local client, according to claim 2 wherein the at least one credential includes at least one of: a passphrase, password, PIN, biometric scan, question and answer session.

15. A non-transitory computer readable medium containing software and provided in a local client device in processing communications with a server, the software performing a method comprising:
   displaying available administrative security functions on the local client device;
   receiving a selection from the user for an administrative security function from the displayed administrative security functions;
   generating and sending an administrative access request to the server to perform the at least one administrative security function to on a security token;
   wherein the security token is separate from the local client device;
   prompting the user for at least one user credential;
   authenticating the user to the remote server, based on the at least one user credential;
   in response to the server authenticating the user:
   mediating the at least one administrative security function between the server, the client and the security token, wherein the server responds to the administrative access request by retrieving the at least one administrative function and sending the at least one administrative function to said local client device for routing into said security token and performing the at least one administrative function on the security token the at least one administrative security function and wherein the at least one administrative access request includes authenticating the user to the server using at least one credential without requiring the user to log on to an operating environment associated with the local client device.

16. The non-transitory computer readable medium, according to claim 15 wherein the server and the local client mutually authenticate to each other.

17. The non-transitory computer readable medium, according to claim 16 wherein the server is authenticated to the local client using a public key infrastructure methodology.

18. The non-transitory computer readable medium, according to claim 17 wherein the public key infrastructure methodology includes challenge/response authentication or digital certificate exchange.

19. The non-transitory computer readable medium, according to claim 16 wherein the security token is unlocked.

20. The non-transitory computer readable medium, according to claim 16 wherein diagnostics are performed on the security token.

21. The non-transitory computer readable medium, according to claim 16 wherein the security token is reactivated and deactivated.

22. The non-transitory computer readable medium, according to claim 16 wherein a replacement security token is requested.

23. The non-transitory computer readable medium, according to claim 16 wherein a temporary password is enabled.

24. The non-transitory computer readable medium, according to claim 16 wherein the user is automatically allowed access to the system resources and services.

25. The non-transitory computer readable medium, according to claim 16 wherein the user reports that the security token has been lost, damaged or stolen.

26. The non-transitory computer readable medium, according to claim 16 wherein the processing communications includes a secure communications protocol.

27. The non-transitory computer readable medium, according to claim 26 wherein the secure communications protocol includes SSL, SSH, TLS, WAP or IPSEC.

28. The non-transitory computer readable medium, according to claim 16 wherein the at least one credential includes at least one of: a passphrase, password, PIN, biometric scan, question and answer session.

* * * * *